(12) United States Patent
Sandorfi

(10) Patent No.: US 8,459,708 B1
(45) Date of Patent: Jun. 11, 2013

(54) TELESCOPING GRILLING TONG

(76) Inventor: Roger J. Sandorfi, Lynbrook, NY (US)

( * ) Notice: Subject to any disclaimer, the term of this patent is extended or adjusted under 35 U.S.C. 154(b) by 143 days.

(21) Appl. No.: 12/961,554

(22) Filed: Dec. 7, 2010

(51) Int. Cl.
A47J 43/28 (2006.01)

(52) U.S. Cl.
USPC .............................. 294/99.2; 294/16; 294/104

(58) Field of Classification Search
USPC ................. 294/3, 7, 9, 8.5, 11, 16, 99.2, 104, 294/210; 30/150
See application file for complete search history.

(56) References Cited

U.S. PATENT DOCUMENTS

| | | | | |
|---|---|---|---|---|
| 211,855 | A | * | 2/1879 | Kinzer ............................. 294/11 |
| 282,105 | A | * | 7/1883 | Murchison ....................... 294/11 |
| 297,736 | A | * | 4/1884 | Wood ............................... 294/11 |
| 337,733 | A | * | 3/1886 | Bishop ............................. 294/11 |
| 2,670,234 | A | * | 2/1954 | Roop ........................... 294/99.2 |
| 3,692,347 | A | | 9/1972 | Bixler |
| 3,906,632 | A | * | 9/1975 | Oppenheimer ................. 30/322 |
| 4,176,871 | A | | 12/1979 | Stover |
| 4,615,555 | A | | 10/1986 | Bateham |
| 4,707,922 | A | * | 11/1987 | Hosak-Robb .................. 30/322 |
| 5,199,756 | A | | 4/1993 | Bartlett et al. |
| 5,206,998 | A | * | 5/1993 | Oriente et al. .................. 30/142 |
| 5,435,611 | A | | 7/1995 | Campbell et al. |
| 5,774,994 | A | * | 7/1998 | Stein et al. ...................... 30/342 |
| 5,934,721 | A | | 8/1999 | Walde |
| 6,726,263 | B2 | * | 4/2004 | Wang et al. ..................... 294/16 |
| 2007/0262597 | A1 | | 11/2007 | Ramos |

OTHER PUBLICATIONS

Starlit Silicone Telescoping Tongs 12". Amazon.com. http://www.amazon.com/gp/product/B000X9IFJG/ref=pd_lpo_k2_dp_sr_1?pf_rd_p=486539851 . . . Accessed Nov. 20, 2009.
Amco Telescoping Tongs. Dillards. http://www.dillards.com/webapp/wcs/stores/servlet/ProductDisplay?catalogId=301&storeId=301&langId=-1&productId=501227971&linkshare=http://www.prontohome.com/affiliate. Accessed Nov. 20, 2009.

* cited by examiner

*Primary Examiner* — Dean Kramer
(74) *Attorney, Agent, or Firm* — Montgomery Patent & Design; Robert C. Montgomery

(57) ABSTRACT

A cooking device is provided with a pair of length adjustable grilling tongs. One of the pair of tongs is pivotably mounted for outward and inward movement in relation to an opposing tong. The pivotably mounted tong includes an outwardly biasing spring for separating the opposing tongs. Each tong is slidably connected within a hollow channeled handle which allows a gripping end of the tongs to extend and retract in relation to the handles while remaining rigid. The pivotable movement of the handle and tong may be locked to allow a user to selectively close the tongs for storage.

17 Claims, 7 Drawing Sheets

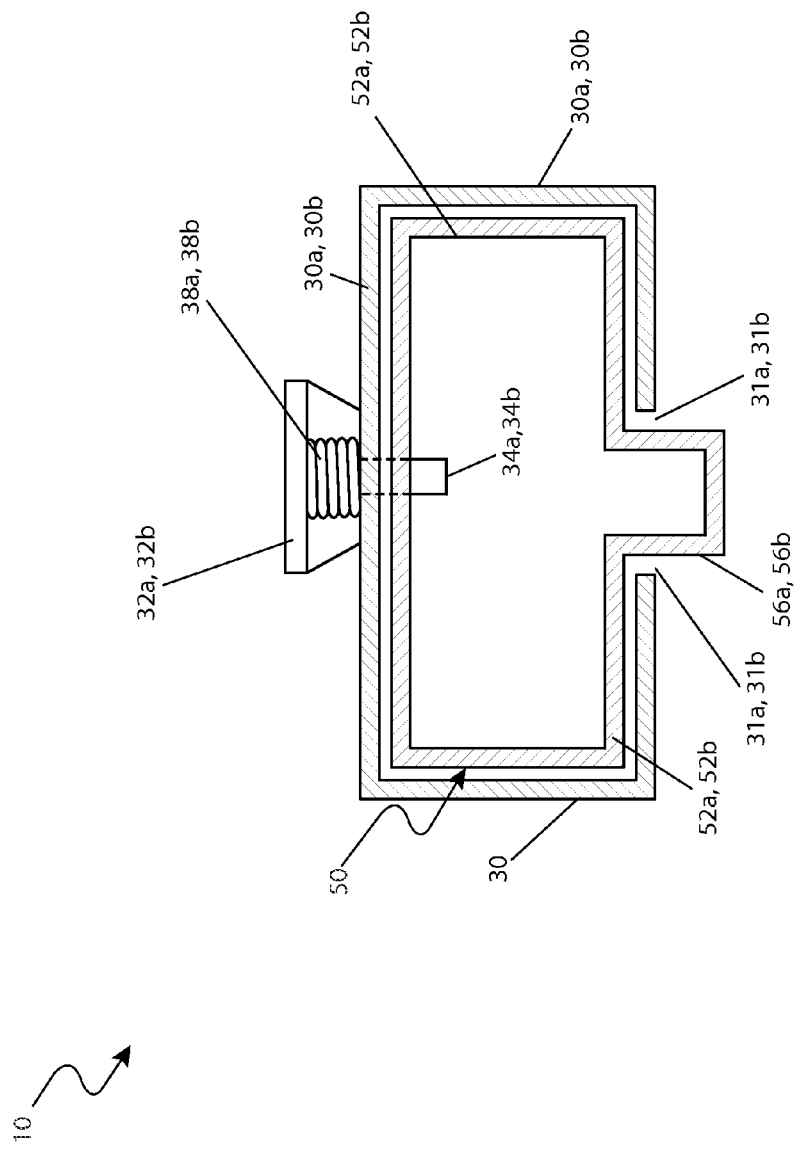

TELESCOPING GRILLING TONG

RELATED APPLICATIONS

The present invention was first described in a notarized Official Record of Invention on Oct. 1, 2009, that is on file at the offices of Montgomery Patent and Design, LLC, the entire disclosures of which are incorporated herein by reference.

FIELD OF THE INVENTION

The present invention relates generally to barbeque tongs, and in particular, to a grilling tong having independently telescoping tongs.

BACKGROUND OF THE INVENTION

Spending time in the great outdoors is among the most popular fair weather leisure time activities. Quite often, cooking and eating a meal is made part of the outdoor activity. Whether it is a family gathering, a picnic, or just having a cookout, a great deal of time is spent around a barbeque grill. One (1) of the most common tools used while grilling is a pair of grilling tongs. Such tongs allow for placement, turning, and removal of almost any food item from the grill with a large amount of control and accuracy.

There are many examples of grilling tongs and similar gripping cooking utensils. These tongs generally include a pair of opposing jaws which open and close in relation to each other by way of a spring or a scissor type hinge mechanism for gripping food items and manipulating their placement or position.

Unfortunately, most of these tongs are fairly short in length and lack a convenient way to customize their size. This is especially problematic on very large grills where food items may be placed well beyond normal reach. As such, many people find their hands too close to the flame and heat and risk burns or singeing of the hair on their arms and hands. While some tongs are made to be longer, they present additional difficulty and inconvenience when being stored in a cabinet or drawer.

SUMMARY OF THE INVENTION

The inventor recognized the aforementioned inherent problems and lack in the art and observed that there is a need for a device and method by which grilling tongs can be afforded an overall longer length for safety reasons, but without the disadvantages of longer length tongs. It is an object of the present disclosure to solve these problems.

The inventor recognized these problems and has addressed this need by developing of a telescoping grilling tong which provides for barbequing while using tongs with almost no risk of becoming burned or singed. The inventor has thus realized the advantages and benefits of providing a telescoping grilling tong having a rigid end portion with a generally "U"-shape, an upper handle pivotably attached to an end of the end portion, and a lower handle rigidly affixed to an opposite end of the end portion generally parallel to the upper handle. An upper tong is slidingly attached within a hollow channel provided by the upper handle. The upper tong includes an upper tong arm terminating in an upper tong gripper, an upper stop bar extending from an inwardly facing surface of the upper tong arm and protruding through a slot in the upper handle, and an upper stop feature extending perpendicularly from the upper tong inwardly facing surface opposite the upper tong gripper. A lower tong is slidingly attached within the lower handle. The lower tong includes a lower tong arm terminating in a lower tong gripper, a lower stop bar extending from an inwardly facing surface of the lower tong arm and protruding through a slot in the lower handle, and a lower stop feature extending perpendicularly from the lower tong inwardly facing surface opposite the lower tong gripper. Contact of the upper stop feature and the lower stop feature provide a limit to the inward movement of the upper tong with respect to the lower tong. The upper tong and the lower tong are length adjustable in relation to the upper handle and lower handle, respectively. The upper tong is movable with respect to the lower tong for gripping an object. A hinge is affixed between the end portion and the upper handle for providing pivotable motion to the upper handle and a spring extends between the end portion and the upper handle for outwardly biasing the upper handle with respect to the end portion. A locking mechanism is slidably connected between the end portion and the upper handle. Placing the locking mechanism in a rearward position allows the upper handle to pivot with respect to the end portion and placing the locking mechanism in a forward position restricts outward movement of the upper tong and maintains the upper handle in a substantially closed position.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 3 is a section view of an upper handle 30a of the telescoping grilling tong 10 taken along section line A-A of FIG. 2a, according to the preferred embodiment;

| | DESCRIPTIVE KEY |
|---|---|
| 10 | telescoping grilling tong |
| 20 | end portion |
| 30a | upper handle |
| 30b | lower handle |
| 31a | upper handle slot |
| 31b | lower handle slot |
| 32a | upper release lever |
| 32b | lower release lever |
| 34a | upper lock pin |
| 34b | lower lock pin |
| 35a | upper lock pin aperture |
| 35b | lower lock pin aperture |
| 36a | upper pivot pin |
| 36b | lower pivot pin |
| 38a | upper compression spring |
| 38b | lower compression spring |
| 39a | upper post |
| 39b | lower post |
| 40 | hinge |
| 41 | hinge mounting flange |
| 42 | spring |
| 44 | fastening means |
| 46 | locking mechanism |
| 48 | slot |
| 50a | upper tong |
| 50b | lower tong |
| 52a | upper tong arm |
| 52b | lower tong arm |
| 54a | upper tong gripper |
| 54b | lower tong gripper |
| 56a | upper stop bar |
| 56b | lower stop bar |
| 58a | upper stop feature |
| 58b | lower stop feature |
| 60a | upper length adjustment aperture |
| 60b | lower length adjustment aperture |

DETAILED DESCRIPTION OF THE PREFERRED EMBODIMENT

The best mode for carrying out the disclosure is presented in terms of a preferred embodiment, herein depicted within FIGS. 1 through 5. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

The present disclosure describes a telescoping grilling tong (herein described as "device") 10, which provides a tong-style cooking tool giving a user the ability to handle food items when barbequing with almost no risk of becoming burned or singed due to coming into close proximity with the heat and flames of the grill.

Figure 1:
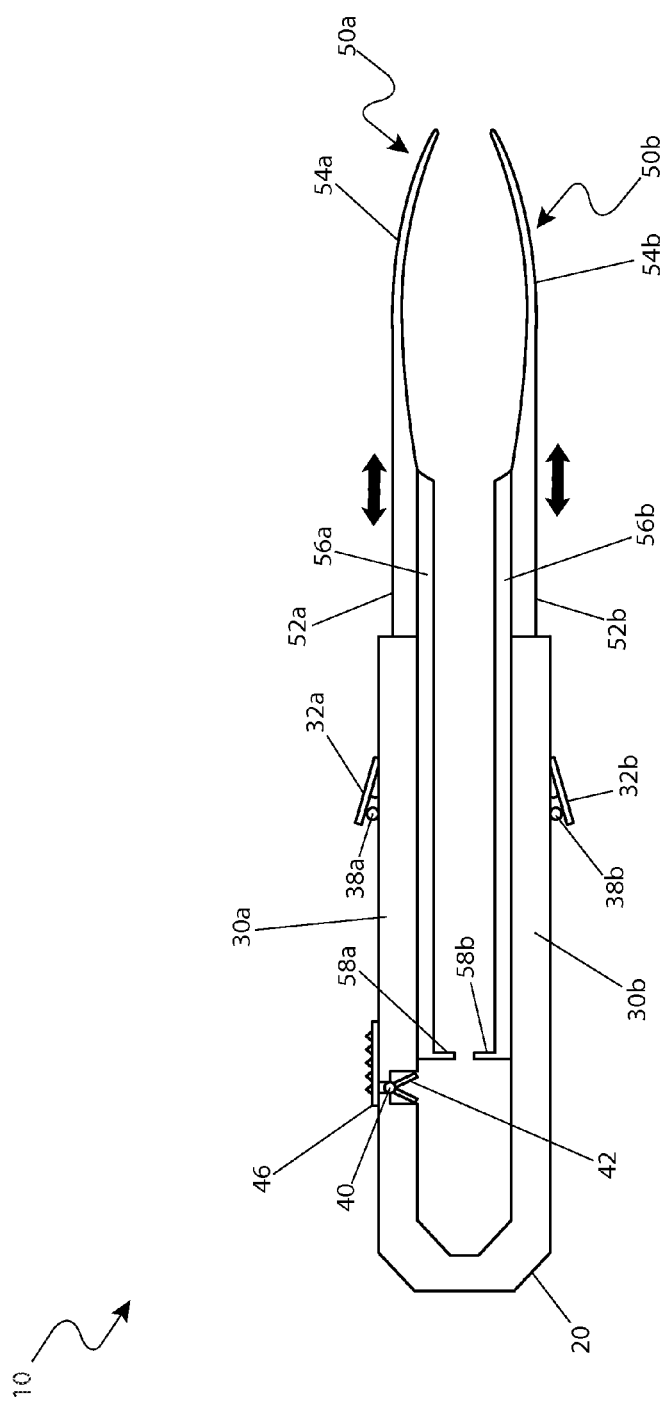
FIG. 1 is a side view of a telescoping grilling tong 10 depicted in a closed and locked state, according to a preferred embodiment.

Referring now to FIG. 1, a side view of the device 10, is disclosed. The device 10 generally includes a pair of telescoping tong arms which slidingly retract inwardly and extend outwardly from a hollow ergonomic handle which allow a respective pair of tong grippers to be positioned at a variable distance from the user's hand. The pair of tong grippers is secured at a desired length by a pair of respective release levers. A locking mechanism allows the user to secure the device 10 in a closed state for compact storage.

Figure 2A:
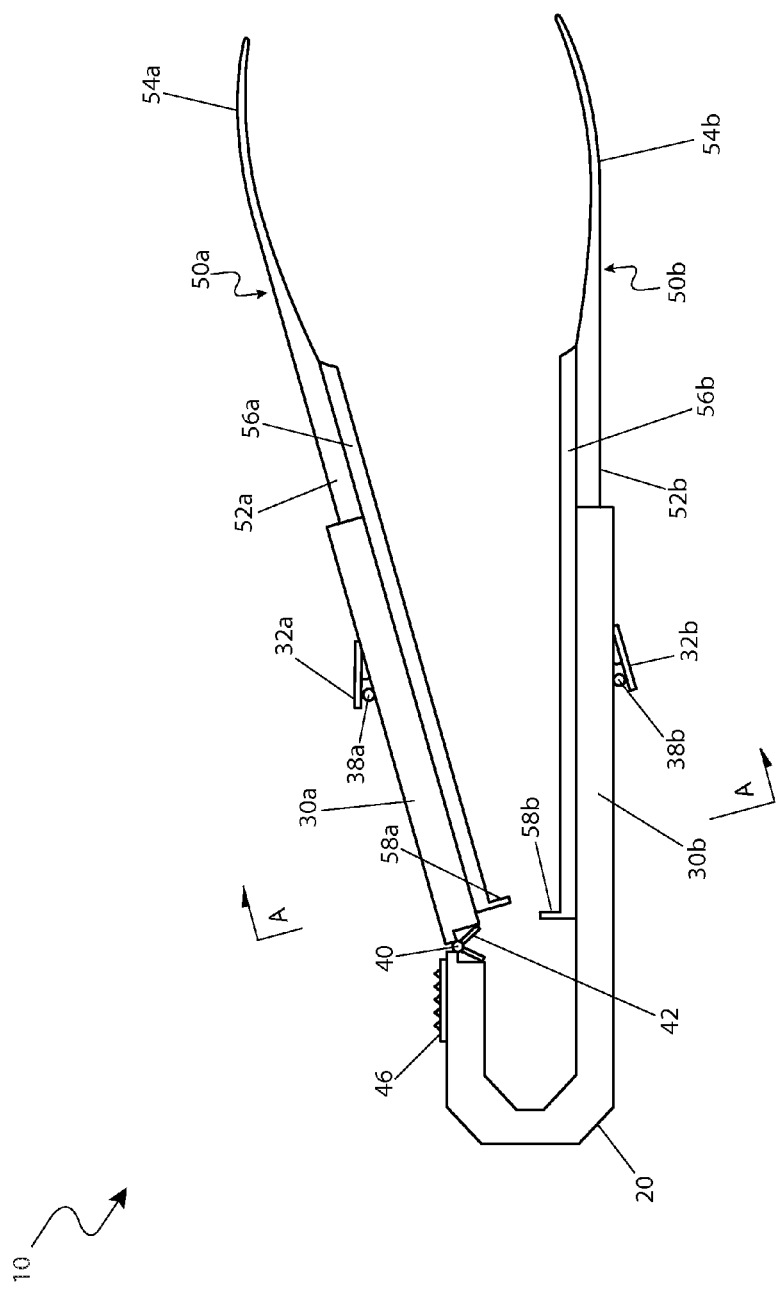
FIG. 2a is a side view of the telescoping grilling tong 10 depicted in an open and unlocked state, according to the preferred embodiment.
Figure 2B:
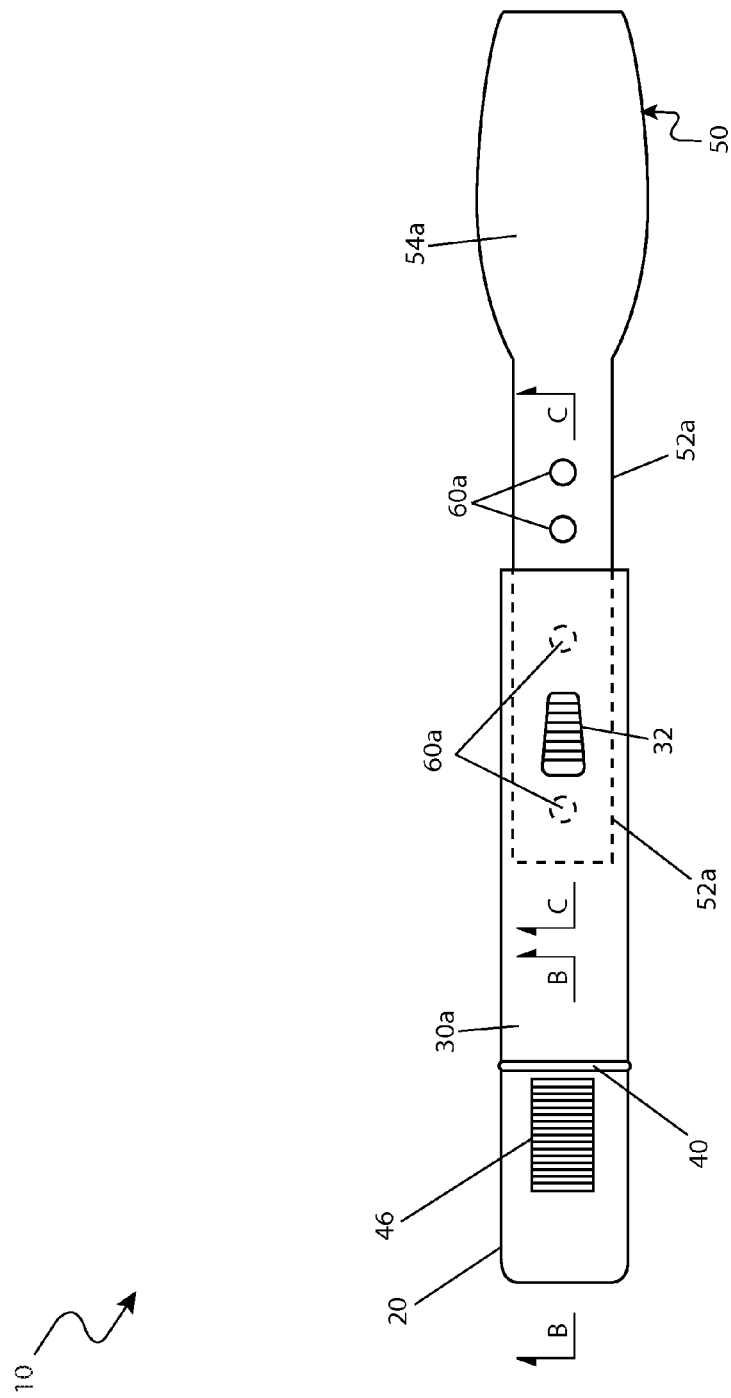
FIG. 2b is a top view of the telescoping grilling tong 10, according to the preferred embodiment.

Referring now to FIGS. 2a and 2b, a side and a top view of the device 10, are disclosed. The device 10 includes an end portion 20, an upper handle 30a, a lower handle 30b, an upper tong 50a, and a lower tong 50b. The end portion 20 includes a generally "U"-shaped ergonomic grip which is attached to and operates in conjunction with the upper handle portion 30a by a joining hinge 40 having an affixed torsion spring 42. The device 10 provides for a convenient holding and operation by the user with only one (1) hand. The lower handle 30b extends outwardly from and is a rigidly connected to the end portion 20 parallel to the upper handle 30a. The upper and lower handles 30a, 30b each include a hollow, hard-plastic linear body having a rectangular cross section. The upper handle 30a and lower handle 30b are envisioned to be introduced in a variety of attractive colors and patterns. Additionally, the upper handle 30a and lower handle 30b each include a particularly shaped and sized internal space to allow for the snug insertion of a respective upper tong 50a, and lower tong 50b having a correspondingly similar shape which allows for a telescopic engagement therebetween.

The upper handle 30a includes a finger-operated locking mechanism 46 which provides a way to secure the upper handle 30a and the lower handle 30b in a coplanar position, allowing compact storage of the device 10. The upper handle 30a and the lower handle 30b also include an integral upper release lever 32a and lower release lever 32b, respectively. The upper release lever 32a and lower release lever 32b provide a way of securing the upper tongs 50a and lower tongs 50b at the desired inserted length. The telescoping function of the upper tongs 50a and lower tong 50b enable easy adjustment of the overall length of the device 10 between approximately fourteen (14) and twenty (20) inches.

The upper tong 50a and lower tong 50b each include a one-piece stainless steel utensil having respective operational features including: an upper tong arm 52a, a lower tong arm 52b, an upper tong gripper 54a, a lower tong gripper 54b, an integral upper stop bar 56a, and lower stop bar 56b. The upper tong gripper 54a and lower tong gripper 54b preferably include an arcuate profile with outer edges having a generally spatula shape as shown in FIG. 2b. The preferred shape of the upper tong arm 50a and lower tong arm 50b is envisioned to be suitable for grasping and manipulating various food items typically prepared by grilling and similar cooking procedures; however, it is understood that the upper tong gripper 54a lower tong gripper 54b may be introduced having various lateral and profile shapes such as, but not limited to: flat, cupped, pronged, or pointed, being particularly suitable for various cooking tasks and as such should not be interpreted as a limiting factor of the device 10.

Referring now to FIG. 3, a section view of an upper arm portion 30a of the device 10 taken along section line A-A of FIG. 2a, is disclosed. Although the upper handle 30a is described here for clarity, it can be appreciated that the description provided for the upper handle 30a would be substantially identical to a separated description of the lower handle 30b. The drawing views depict both the upper and lower components and it is understood that the description of the upper components can be incorporated to include a similar description for the lower components as illustrated by a similar part number with a "b" subscript. The sliding engagement of the upper tong arm 52a in relation to the upper handle 30 and upper handle slot 31a would also be substantially equivalent for the lower tong arm 52b in relation to the lower handle 30b and a lower handle slot 31b, as illustrated in FIG. 1.

The upper handle 30 includes a hollow rectangular shape allowing the upper tong arm 52a to smoothly slide therewithin. The upper handle 30a has an internal shape and size as to allow insertion and extension of the upper tong arm 52a in a telescoping manner. The interface between the interior of the upper handle 30a and the upper tong arm 52a is preferably smooth and snug which provides for stable and uniform motion between parts. The upper handle 30 also includes a linear handle slot 31a along an inward-facing surface which allows the upper stop bar 56a to protrude downwardly therethrough as seen in FIGS. 1 and 2a.

The upper stop bar 56a includes a hollow linear appendage which protrudes through an inwardly-facing surface of a respective upper handle slot 31a. The upper stop bar 56a includes a respective integral upper stop features 58a along a rearward edge. The description provided for the upper handle tong arm 50a would be substantially identical to a separated description of the lower tong arm 50b and include substantially equivalent "lower" feature. The upper stop features 58a and lower stop feature 58b each protrude inwardly at approximate right angles and make incidental contact with each other during a closing motion of the upper tong arm 50a to halt the closing motion and prevent over-closure or damage to the upper tong grippers 54a and lower tong gripper 54b.

Figure 4A:
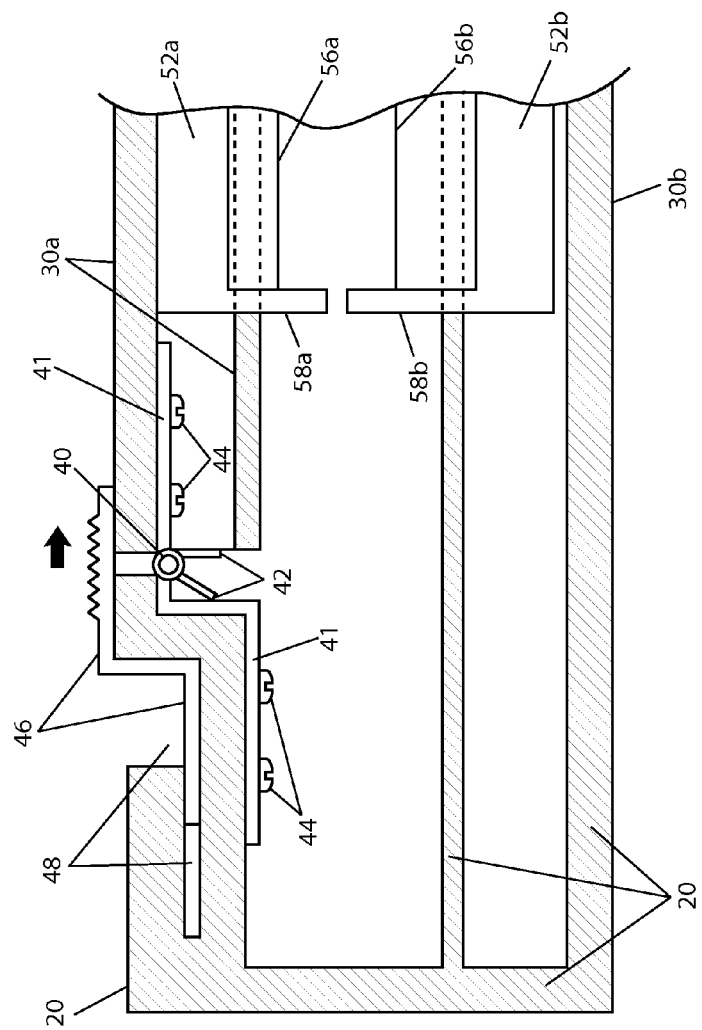
FIG. 4a is a section view of a hinge 40 and the upper handle 30a of the telescoping grilling tong 10 depicted in the closed and locked state taken along section line B-B of FIG. 2b, according to the preferred embodiment.
Figure 4B:
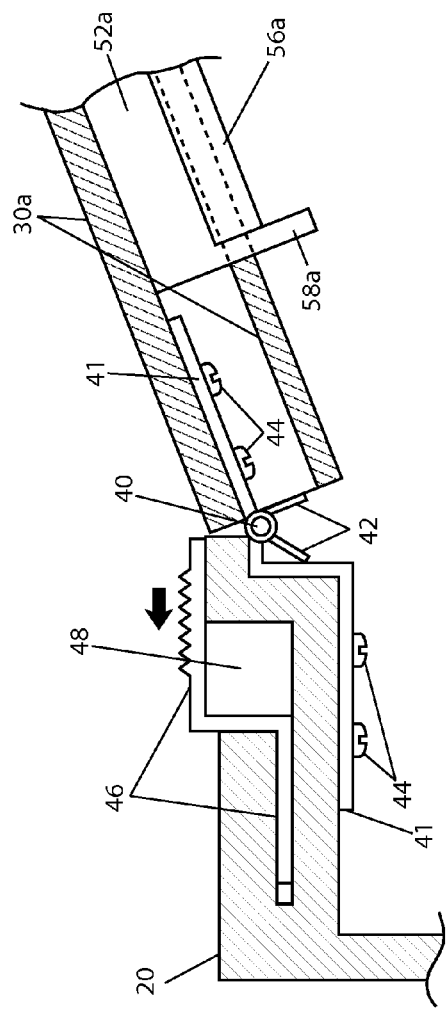
FIG. 4b is a section view of the hinge 40 and the upper handle 30a of the telescoping grilling tong 10 depicted in an open and unlocked state taken along section line B-B of FIG. 2b, according to the preferred embodiment; and, FIG. 5 is a section view of the telescoping grilling tong 10 depicting an upper release lever 32a taken along section line C-C of FIG. 2b, according to a preferred embodiment of the present invention.

Referring now to FIGS. 4a and 4b, section views of the hinge 40 and upper handle 30a, depicted in closed and locked and open and unlocked states, respectively, are disclosed. The hinge 40 provides a way of joining the end portion 20 and the upper handle 30a. The hinge 40 includes a multi-element stainless steel axial mechanism having a pair of mounting flanges 41 and a torsion spring 42. The hinge mounting flanges 41 include contoured profiles which match and are affixed to interior surfaces of the end portion 20 and upper handle 30a, respectively. The hinge mounting flanges 41 are affixed using mechanical fasteners such as rivets, screws, or the like. The torsion spring 42 is integrated into the hinge 40 and provides a pivoting force along an axis of the spring 42 biasing the upper handle 30a to the open position and opposing the closing motion of the upper handle 30a during use.

The locking mechanism 46 includes a finger-operated slider component having a captivated generally "Z"-shaped sliding member. A lower portion of the locking mechanism 46 is guided within a slot 48 which is molded into the end portion 20. An upper portion is exposed and engaged by the finger of the user and slides along a top surface of the end portion 20. The locking mechanism 46 is envisioned being made of similar materials as the end portion 20 and upper handle 30a and having a textured top surface providing a frictional engaging surface. The locking mechanism 46 is adjacent to the hinge 40 and is forwardly slidable by the user to cover an adjacent top surface of the upper handle 30a. Once the locking mechanism 46 is slid to a forward position, it secures the adjacent top surfaces of both the end portion 20 and upper handle 30a in a coplanar position and restricts a clamping motion of the upper handle 30a and upper tong 50a.

Figure 5:
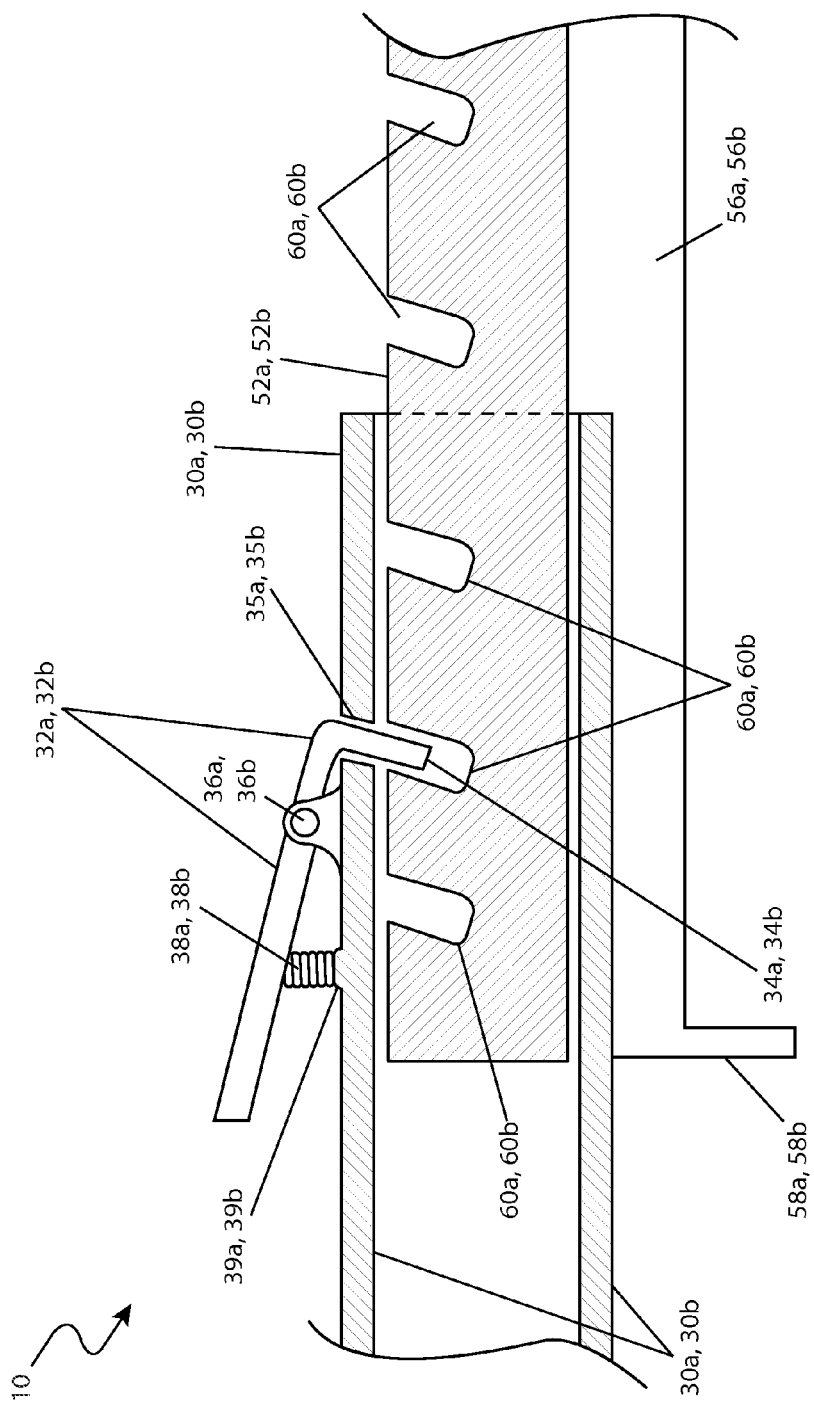

Referring now to FIG. 5, a section view of the upper release lever 32a taken along section line C-C of FIG. 2b, is disclosed. The upper handle 30a and lower handle 30b each include a respective upper release lever 32a and lower release lever 32b located upon a forward outer surface of the upper handle 30a and lower handle 30b, respectively. The device also includes a locking mechanism which secures the upper tong 50a and lower tong 50b at a desired length with respect to the upper handle 30a and lower handle 30b. The upper and lower locking mechanism each include respective components, including: an upper lock pin 34a, a lower lock pin 34b, a plurality of upper lock pin apertures 35a, a plurality of lower lock pin apertures 35b, an upper pivot pin 36a, a lower pivot pin 36b, an upper compression spring 38a, a lower compression spring 38b, an upper post 39a, and a lower post 39b. Although the upper release lever 32a is described here for clarity, it can be appreciated that the description provided for the upper release lever 32a would be substantially identical to a separate description of the lower release lever 32b. The drawing views depict both the upper and lower components and it is understood that the description of the upper components can be incorporated to include a similar description for the lower components as illustrated by a similar part number with a "b" subscript. The upper release lever 32a includes an "L"-shaped rotating fixture forming a right angle and having an inwardly pointing upper lock pin 34a at a proximal end which passes through an upper lock pin aperture 35a through the upper handle 30a and subsequently protruding into one (1) of a plurality of equally-spaced upper length adjustment apertures 60a linear disposed along a longitudinally upper surface of the upper tong arm 52a. The upper handle 30a provides for permanent attachment of the upper release lever 32a by a molded-in upper pivot pin mechanism 36a. The upper pivot pin mechanism 36a is rotatably attached to the upper release lever 32a at an intermediate position. The upper lock pin 34a of the upper release lever 32a is retained within one of the plurality of upper length adjustment apertures 60a by the upper compression spring 38a in contact with a distal bottom surface of the upper release lever 32a. The upper compression spring 38a is preferably held in position by an upper post 39a which is preferably molded into the upper handle 30a.

It is envisioned that other styles and configurations of the present disclosure can be easily incorporated into these teachings and only one particular configuration has been shown and described for purposes of clarity and disclosure and not by way of limitation of scope.

The preferred embodiment of the present disclosure can be utilized by the common user in a simple and effortless manner with little or no training. After initial purchase or acquisition of the device 10, it would be utilized as indicated in FIGS. 1, 2a, and 2b.

A method of utilizing the device 10 may be achieved by performing a series of steps, however it is understood that various other methods of utilization are envisioned. A user procures a model of the device 10 having a desired color and design for the upper and lower handles 30a, 30b and desired shape of upper and lower tong grippers 54a, 54b. The upper and lower handle portions 30a, 30b are gripped using one (1) hand in a conventional manner. The locking mechanism 46 is slid rearwardly to allow the upper handle portion 30a to pivot upwardly due to the force of the torsion spring 42, thereby separating the upper tong gripper 54a from the lower tong gripper 54b. The extended length of the upper tong 50a and lower tong 50b are adjusted by pressing the upper release lever 32a and the lower release lever 32b and sliding the respective upper tong arm 52a and lower tong arm 52b outwardly until obtaining the desired overall length. The upper tong arm 52a and lower tong arm 52b are secured at the desired position by releasing the upper release lever 32a and lower release lever 32b, thereby allowing the integral upper lock pin 34a and lower lock pin 34b to engage an aligned one (1) of the plurality of upper adjustment apertures 60a and lower adjustment apertures 60b by a spring force provided from the upper compression spring 38a and lower compression spring 38b. The process is repeating to further lengthen or shorten the position of the upper tong 50a and lower tong 50b with respect to the upper handle 30a and lower handle 30b. In the in-use state, the upper tong arm 52a and the lower tong arm 52b positioned such that both the upper tong gripper 54a and the lower tong gripper 54b are at an equivalent position. The user is then able to grasp and manipulate various food items during grilling or similar cooking tasks. The overall length of the device 10 is selectively adjustable as needed while cooking and provides the user the benefit of a food manipulating utensil having a fast and easy length adjustment.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A telescoping grilling tong comprising:
   a rigid end portion having a generally U-shape;
   an upper handle pivotably attached to an end of said end portion;
   a locking mechanism slidably connected between said end portion and said upper handle;
   a lower handle rigidly affixed to an opposite end of said end portion generally parallel to said upper handle;
   an upper tong connected to said upper handle comprising an upper tong arm terminating in an upper tong gripper; and,
   a lower tong connected to said lower handle comprising a lower tong arm terminating in a lower tong gripper;
   wherein said upper tong is movable with respect to said lower tong for gripping an object;
   wherein placing said locking mechanism in a rearward position allows said upper handle to pivot with respect to said end portion; and,
   wherein placing said locking mechanism in a forward position restricts outward movement of said upper tong maintaining said upper handle in a substantially closed position.

2. The tong of claim 1, wherein said locking mechanism further comprises a generally Z-shaped member having an end in slidable contact above a pivot point between said end portion and said upper handle and an opposite end slidably mounted within a slot disposed in said end portion.

3. The tong of claim 1, wherein said upper handle further comprises a hollow channel for slidably receiving said upper tong; and,
   said lower handle further comprises a hollow channel for slidably receiving said lower tong;
   wherein said upper tong and said lower tong are length adjustable.

4. The tong of claim 3, wherein said upper tong further comprises:
   an upper stop bar extending from a inwardly facing surface of said upper tong arm and protruding through a slot in said upper handle; and,
   an upper stop feature extending perpendicularly from said upper tong inwardly facing surface opposite said upper tong gripper;
   wherein said lower tong further comprises:
   a lower stop bar extending from an inwardly facing surface of said lower tong arm and protruding through a slot in said lower handle; and,
   a lower stop feature extending perpendicularly from said lower tong inwardly facing surface opposite said lower tong gripper;
   wherein contact of said upper stop feature and said lower stop feature limit inward movement of said upper tong with respect to said lower tong.

5. The tong of claim 1, wherein said upper tong gripper and said lower tong gripper each further comprise a generally spatula shape.

6. The tong of claim 5, wherein said upper tong gripper and said lower tong gripper each further comprise an arcuate profile.

7. The tong of claim 6, wherein said upper tong gripper and said lower tong gripper each further comprise a solid member.

8. A telescoping grilling tong comprising:
   a rigid end portion having a generally U-shape;
   an upper handle forming a hollow channel pivotably attached to an end of said end portion;
   a lower handle forming a hollow channel rigidly affixed to an opposite end of said end portion generally parallel to said upper handle;
   an upper tong slidingly attached within said upper handle, said upper tong further comprising:
      an upper tong arm terminating in an upper tong gripper;
      an upper stop bar extending from a inwardly facing surface of said upper tong arm and protruding through a slot in said upper handle; and,
      an upper stop feature extending perpendicularly from said upper tong inwardly facing surface opposite said upper tong gripper; and,
   a lower tong slidingly attached within said lower handle; said lower tong further comprising:
      a lower tong arm terminating in a lower tong gripper;
      a lower stop bar extending from an inwardly facing surface of said lower tong arm and protruding through a slot in said lower handle; and,
      a lower stop feature extending perpendicularly from said lower tong inwardly facing surface opposite said lower tong gripper;
   wherein said upper tong and said lower tong are length adjustable;
   wherein said upper tong is movable with respect to said lower tong for gripping an object; and,
   wherein contact of said upper stop feature and said lower stop feature limit inward movement of said upper tong with respect to said lower tong.

9. The tong of claim 8, further comprising a hinge affixed between said end portion and said upper handle for providing pivotable motion and a spring extending between said end portion and said upper handle for outwardly biasing said upper handle with respect to said end portion.

10. The tong of claim 9, further comprising a locking mechanism slidably connected between said end portion and said upper handle;
   wherein placing said locking mechanism in a rearward position allows said upper handle to pivot with respect to said end portion; and,
   wherein placing said locking mechanism in a forward position restricts outward movement of said upper tong maintaining said upper handle in a substantially closed position.

11. The tong of claim 10, wherein said upper handle further comprises an actuated upper release lever adjacent to an open end for locking said upper tong into a selectable position within said upper handle; and, said lower handle further comprises an actuated lower release lever adjacent to an open end for locking said lower tong into a selectable position within said lower handle.

12. The tong of claim 11, wherein said upper release lever further comprises an upper lever arm pivotably attached to said upper handle terminating in an upper pin that releasably engages one of a plurality of upper pin apertures disposed in said upper tong arm and an upper compression spring extending between said upper handle and said upper lever arm for biasing said upper pin into an engaged position; and, said lower release lever further comprises a lower lever arm pivotably attached to said lower handle terminating in a lower pin that releasably engages one of a plurality of lower pin apertures disposed in said lower tong arm and a lower compression spring extending between said lower handle and said lower lever arm for biasing said lower pin into an engaged position.

13. The tong of claim 12, wherein said locking mechanism further comprises a generally Z-shaped member having an end in slidable contact above a pivot point between said end portion and said upper handle and an opposite end slidably mounted within a slot disposed in said end portion.

14. The tong of claim 13, wherein said upper tong gripper and said lower tong gripper each further comprise a generally spatula shape.

15. The tong of claim 14, wherein said upper tong gripper and said lower tong gripper each further comprise an arcuate profile.

16. The tong of claim 15, wherein said upper tong gripper and said lower tong gripper each further comprise a solid member.

17. A method of gripping and manipulating an object comprising the steps of:

providing a telescoping grilling tong comprising a rigid end portion having a generally U-shape; an upper handle forming a hollow channel pivotably attached to an end of said end portion; a lower handle forming a hollow channel rigidly affixed to an opposite end of said end portion generally parallel to said upper handle; an upper tong slidingly attached within said upper handle, said upper tong terminating in an upper tong gripper; a lower tong slidingly attached within said lower handle, said lower tong terminating in a lower tong gripper, and a locking mechanism slidably connected between said end portion and said upper handle, wherein placing said locking mechanism in a rearward position allows said upper handle to pivot with respect to said end portion and wherein placing said locking mechanism in a forward position restricts outward movement of said upper tong maintaining said upper handle in a substantially closed position;

providing an object to be gripped;

grasping said upper and lower handles;

allowing said upper handle to pivot outwardly thereby separating said upper tong gripper from said lower tong gripper;

adjusting a position of said upper tong in relation to said upper handle;

adjusting a position of said lower tong in relation to said lower handle; and, gripping and manipulating said object.

\* \* \* \* \*